May 25, 1965

L. J. JOHNSON 3,185,857

CONTROL APPARATUS FOR THE PARALLEL OPERATION OF ALTERNATORS

Filed Feb. 1, 1960

INVENTOR.
LEOPOLD J. JOHNSON
BY
Christie, Parker & Hale
ATTORNEYS

INVENTOR.
LEOPOLD J. JOHNSON
BY
Christie, Parker & Hale
ATTORNEYS

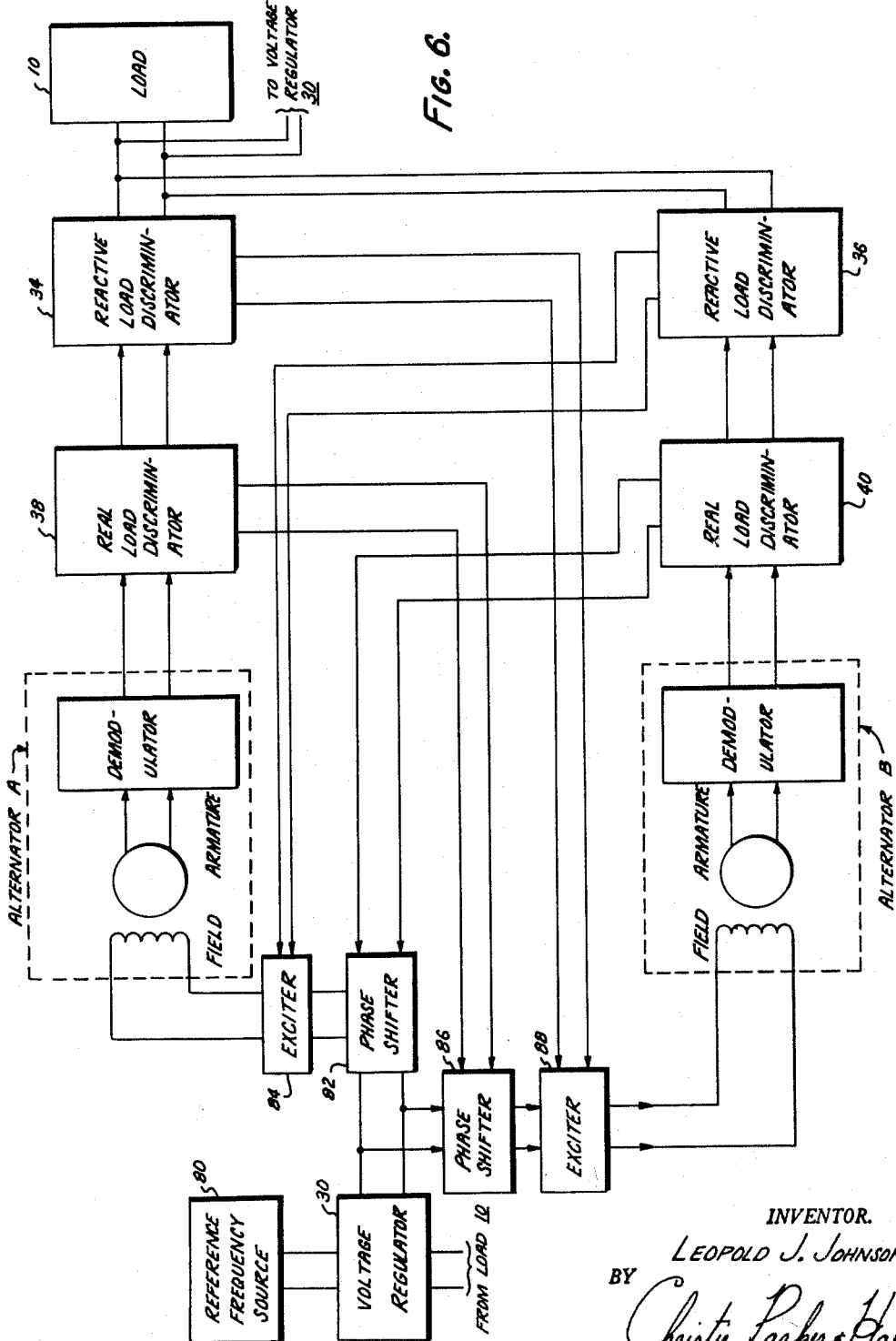

United States Patent Office 3,185,857
Patented May 25, 1965

3,185,857
CONTROL APPARATUS FOR THE PARALLEL OPERATION OF ALTERNATORS
Leopold J. Johnson, Santa Ana, Calif., assignor to Lear Siegler, Inc., a corporation of Delaware
Filed Feb. 1, 1960, Ser. No. 5,845
14 Claims. (Cl. 307—57)

This invention relates to control apparatus for the parallel operation of alternators and in particular to a control system for automatically balancing the real and reactive components of a load supplied by alternators operating in parallel.

This application is a continuation-in-part of my earlier filed application entitled "Control Apparatus for Parallel Operation of Alternators," Serial No. 792,996, now abandoned, and assigned to the same assignee as the present application.

In one of its aspects, this invention relates to frequency controlled alternators of the type disclosed in my earlier patent, granted on September 30, 1958, and bearing the Patent Number 2,854,617. It will now be recognized as a result of my teachings in this earlier patent that the frequency of an alternating current which is produced by an alternator may be controlled independently of the speed of the prime mover for the alternator. This frequency control results by rotating the field of the alternator relative to its rotor so as to compensate for the variations in rotor speed produced by the prime mover to thereby provide an overall desired speed equivalent to the rotor speed plus the speed of rotation of the field. The desired speed is the speed required to produce alternating currents of a frequency bearing a direct relationship to a reference frequency source.

Parallel operation of generators or alternators becomes a necessity when the loads on electrical power and generating systems fluctuate. A common and well known example of fluctuating loads on a power system is the fluctuation that occurs during an ordinary day wherein the load is at a minimum during the night time and reaches a maximum sometime during the day. Generally, it is not desirable or perhaps possible to have one generator large enough to carry the peak load on a large system. With several machines required to supply the load, it becomes necessary to operate the machines in parallel so that their combined output may be transmitted from the same bus bars over outgoing lines. The problems that arise in the parallel operation of generators differ when direct current generators are employed as opposed to the utilization of alternators or alternating current generators. It is well known that alternators operating in parallel must necessarily operate at the same terminal voltage as well as the same frequency. The problems with respect to alternators operating in parallel relate to balancing the load on each alternator and which balancing includes controlling both the reactive and real components of the load. Present methods of balancing the real load (watts) relate to controlling the speed-load characteristic of the prime mover. The speed-load characteristic of the prime mover, in order to be satisfactorily controlled, must have a drooping speed load characteristic in much the same fashion as a direct current generator must have a drooping voltage characteristic. It is necessary to operate on the alternators in this fashion since the real load on the alternators operating in parallel cannot be shifted from one to another by operating on their generator fields. Heretofore operating on the field of an alternator by changing the current in the field windings was effective only to shift the reactive loads (vars) from one alternator to the other. This invention provides a novel and improved system for operating both single phase and polyphase alternators in parallel wherein both the real and reactive components of a load supplied by the parallel operating alternators are automatically controlled by operating on the fields of each alternator. The balancing of the real and reactive components of the load in this manner is accomplished without any currents circulating between the alternators operating in parallel, whereby the efficiency of the alternators is increased. The improved control system for producing the load balance may be advantageously incorporated with the control of the fields of the alternators for producing the desired output frequency in accordance with my aforementioned patent or in accordance with my copending application, Serial No. 785,041, now abandoned, and assigned to the same assignee as the present invention.

The real component of the load is maintained in a balanced relationship between alternators operating in parallel by controlling the phases of the signals applied to a polyphase field winding for each of the alternators to cause the fields to rotate and thereby change the alternator speeds in a direction to bring each of the alternators in balance. The rotation of the fields of the alternators is effective to provide a change in speed of the alternators so that the alternator taking the smaller portion of the real component of the load is speeded up while the alternator taking the greater portion of the real component of the load is retarded or has its speed decreased. This control of the real components of the load is effected by sensing the real component of the load on one of the alternators and providing an output indication thereof and which output indication is utilized to correct or change the phase of the control signals applied to the polyphase windings for the other alternator. The load balance is brought about by utilizing the output indication representative of the greater real load on one alternator to shift the phase of the signals applied to the field for the alternator supplying the lesser real load to speed it up, while the output indication of the lesser real load is used to retard the speed of the alternator carrying the larger real load. In the embodiment illustrated, the real load output indication derived from a discriminating or demodulating circuit is applied to a phase shifting circuit which may comprise a parallel combination of a capacitor and a bridge network having non-linear resistors in each arm thereof to function as a variable resistor in response to the load output indications. The phase shifting network is proportioned so as to be responsive to the real load output indication to shift the phase of the control signal in the correct direction to bring the parallel operating alternators in balance.

In one of its embodiments, wherein only two alternators are operated in parallel, the control arrangement is simplified by merely acting on the field winding of one of the alternators to bring the two alternators in balance. With the two alternators operating at essentially the same frequency, changing the phase of the signals applied to the field windings of one of the alternators will cause a transfer of real load between the alternators so as to force the uncontrolled alternator towards balance.

The control of the reactive component of the load is maintained in balance between alternators operating in parallel by controlling the field strength or the amplitude of the signals applied to the polyphase field windings. The signals applied to the field windings are controlled to compensate for the effects of armature reaction by applying a signal thereto proportioned to transfer the lagging load (vars) from the overexcited to the underexcited alternator, causing the latter alternator to deliver leading or positive vars. This reactive load balance is effected by sensing the reactive load on each alternator and providing output indications thereof. The reactive output indication is applied to control the amplitude of the output signal of the exciter supplying the field current for the polyphase field windings.

The control of the real and reactive load components is advantageously accomplished in accordance with this invention in conjunction with the apparatus for controlling the output frequency of the alternator and which control also operates on the polyphase field windings. In these applications, a source of signals representative of a reference frequency is applied to a phase demodulator along with the signals indicative of the alternator rotor speed to provide an output signal from the phase demodulator having a phase and frequency causing the field to rotate at the correct speed and direction to produce alternating currents of a frequency related to the reference frequency source. When balancing both the real and reactive components of the load or either one in accordance with this invention, the control signals representative of the load component under control is applied to the phase demodulator to proportion the output signals thereof, whereby the signals applied to the field windings of the alternator have been corrected in a direction to cause the real and reactive loads to balance, as well as producing alternating currents of a frequency governed by the reference frequency source.

In the single phase arrangement of the controlled frequency alternator, the field excitation is controlled in the same fashion as in the controlled frequency alternators utilizing a rotating magnetic field.

These and other features of the present invention may be more fully appreciated when considered in the light of the following specification and drawings, in which:

FIG. 6 is a block diagram of another type of alternator arrangement and embodying the invention.

Figure 1:
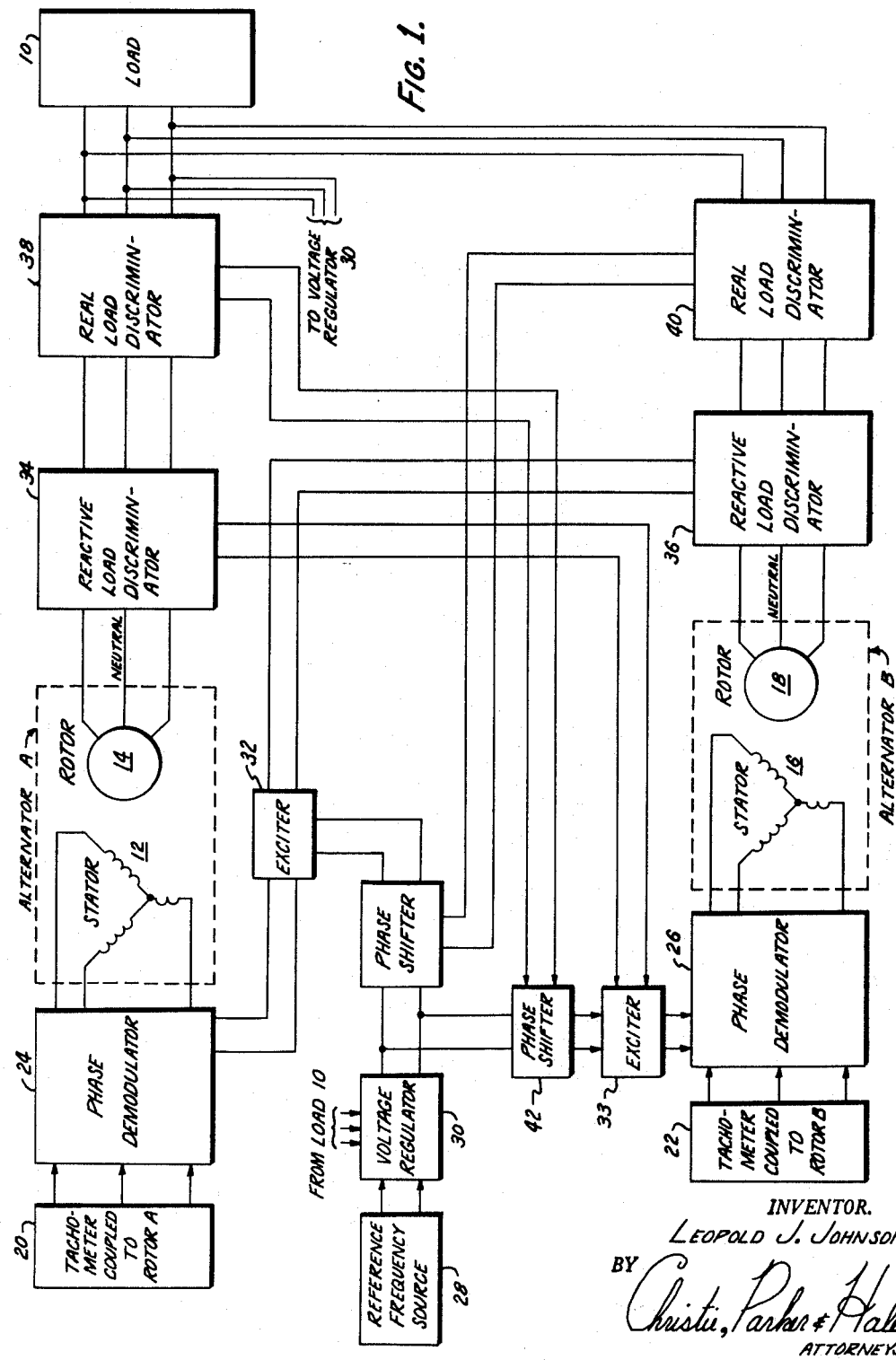
FIG. 1 is a block diagram of the load control system embodying the invention.

The invention will be first examined in conjunction with FIG. 1, wherein the general type of control for balancing the real and reactive components of a load for alternators operating in parallel is illustrated. The invention will be first described in conjunction with frequency controlled alternators of the type disclosed in my above-identified patent, merely to simplify the description.

Each of the parallel operating alternators, shown as a pair of alternators A and B, supply the load 10, and which load is assumed to include real and reactive components therein. Each alternator A and B is of a conventional construction and has saturable magnetic cores and is shown as comprising a polyphase field winding and an armature, in this instance for delivery three-phase power. The polyphase field winding for alternator A is identified by the reference character 12, while the rotor thereof is identified by the reference character 14. In the same fashion, the polyphase field winding for alternator B is identified by the reference character 16, while the rotor thereof is identified by the reference character 18. The field windings 12 and 16 are shown as three-phase Y-connected windings and identified as the stators for alternators A and B, while the armatures are correspondingly identified as three-phase rotors 14 and 18. It will be understood that the alternators A and B may be either rotating or stationary armature type and they may have any desired number of poles and phases.

Tachometers 20 and 22 are respectively provided for the alternators A and B, and which tachometers are connected to the rotor shaft to provide a reference signal having a frequency which is proportional to the speed of rotation of the rotors for alternators A and B, respectively. It will be understood that in operation the prime mover causes the rotors 14 and 16 and the tachometers 20 and 22 to rotate at the same predetermined speeds. Intermediate the stators for each of the alternators A and B and the tachometers 20 and 22 there is provided a phase demodulator respectively identified as the demodulators 24 and 26. The demodulators 24 and 26 serve to provide a plurality of output control signals to the field windings 12 and 16 respectively, having frequencies which are governed by the relative phase relationship and by the difference in the frequencies of the signals which are produced by the tachometers 20 and 22 and a reference signal generator 28. Preferably the number of control signals which are produced by the demodulators 24 and 26 should correspond to the number of phases for the field windings 12 and 16 of the alternators A and B so as to simplify the logic of the connections between the tachometers 20 and 22 and the demodulators 24 and 26 and between these demodulators and the alternators A and B.

The control signals provided by the reference frequency source 28 are coupled to a voltage regulator 30, which is in turn coupled to a pair of amplifiers or exciters 32 and 33. In the usual frequency controlled alternator, the output signal from the exciter is applied to each of the phase demodulators. The comparison or demodulation of the signals coupled to the demodulators 24 and 26 from the exciter 32 and the tachometers 20 and 22 results in the provision of the control signals for each of the windings of the polyphase field windings 12 and 16 to control the field produced thereby. The field windings 12 and 16 of alternators A and B respectively are arranged to produce a rotatable magnetic field for the rotors 14 and 18. The magnetic field may be caused to rotate in either direction and substantially any speed by controlling the frequency and the phase relationship of the three-phase signal which is employed to excite the field windings 12 and 16. It will be recognized that the speed of rotation and the direction of rotation of the field is controlled to compensate for the variations in speed of the rotor produced by the prime mover so as to produce alternating currents of a frequency having a relationship to signals of the reference frequency source 28.

The voltage regulator 30 is coupled (the interconnection is merely indicated in the drawings) to the output terminals of the alternators A and B to sense the delivered load voltage to maintain the terminal voltages of these alternators substantially the same to allow the parallel operating mode. Therefore, the load voltage cannot increase above the regulated voltage and the total load current supplied to the load 10 cannot change appreciably for any given load being dependent on the load impedance only. Other means of regulating the terminal voltages of the alternators A and B including separate voltage regulators may be utilized consistent with the invention.

The reactive loads on alternators A and B are balanced by sensing the reactive load components supplied by alternators A and B through the provision of the reactive load discriminators 34 and 36 coupled to the armatures 14 and 18 respectively. The signals provided by each of the discriminators 34 and 36 are indicative of the reactive loads carried or supplied by their respective alternators. The output signal from the discriminators 34 and 36 may be characterized as being proportional to $i \sin \theta$, wherein "$i$" represents the load current supplied by each alternator and "$\theta$" represents the phase shift between the current and voltage supplied to the load 10 by the alternators. This control signal, $i \sin \theta$, is applied to the exciter for the opposite alternator to change the amplitude of its field in a direction to bring the reactive loads in phase. To this end the control signal derived from the discriminator 34 is applied to the exciter 33 for the phase demodulator 26 while the signal derived from the discriminator 36 is applied to the exciter 32 for application to the phase demodulator 24. It will be recognized that the output signal of the demodulators 24 and 26 will have been corrected in a direction to cause the field strength provided by field windings 12 and 16 to change in a direction to cause the transfer of reactive power from the lagging or overexcited alternator to the underexcited alternator and causing the latter to deliver leading or positive vars.

The real load component supplied by alternators A and B is sensed through the provision of the respective real load discriminators 38 and 40. The signals derived from the discriminators 38 and 40 are representative of the real load, $i \cos \theta$, supplied by the alternators A and B and which output signal is fed back to the opposite alternator in the same fashion as the reactive load indications were to control the respective field windings in different directions. The output of the real load discriminator 38, and which output signal is representative of the real load supplied by alternator A, is coupled to the phase demodulator 26 for alternator B through a phase shifting circuit 42, while the real load signal derived from discriminator 40 is applied to the phase shifter 44 coupled to the phase demodulator 24 for alternator A. The signals derived from the phase shifters 42 and 44 applied to the respective demodulators 26 and 24 are effective to vary the phase of the control signals derived from these demodulators in a fashion to change the rotation of the field in a direction to cause the speed of the alternators to traverse in different directions, whereby the real load component of the load 10 shared by the alternators will be balanced. It will now be seen that the control signals derived from the phase demodulators 24 and 26 for delivery to the field windings 12 and 16 have been proportioned so as to provide a rotating magnetic field compensated to bring the reactive and real load components of the load 10 in balance as well as controlling the output frequency of the currents generated by alternators A and B.

Figure 2:
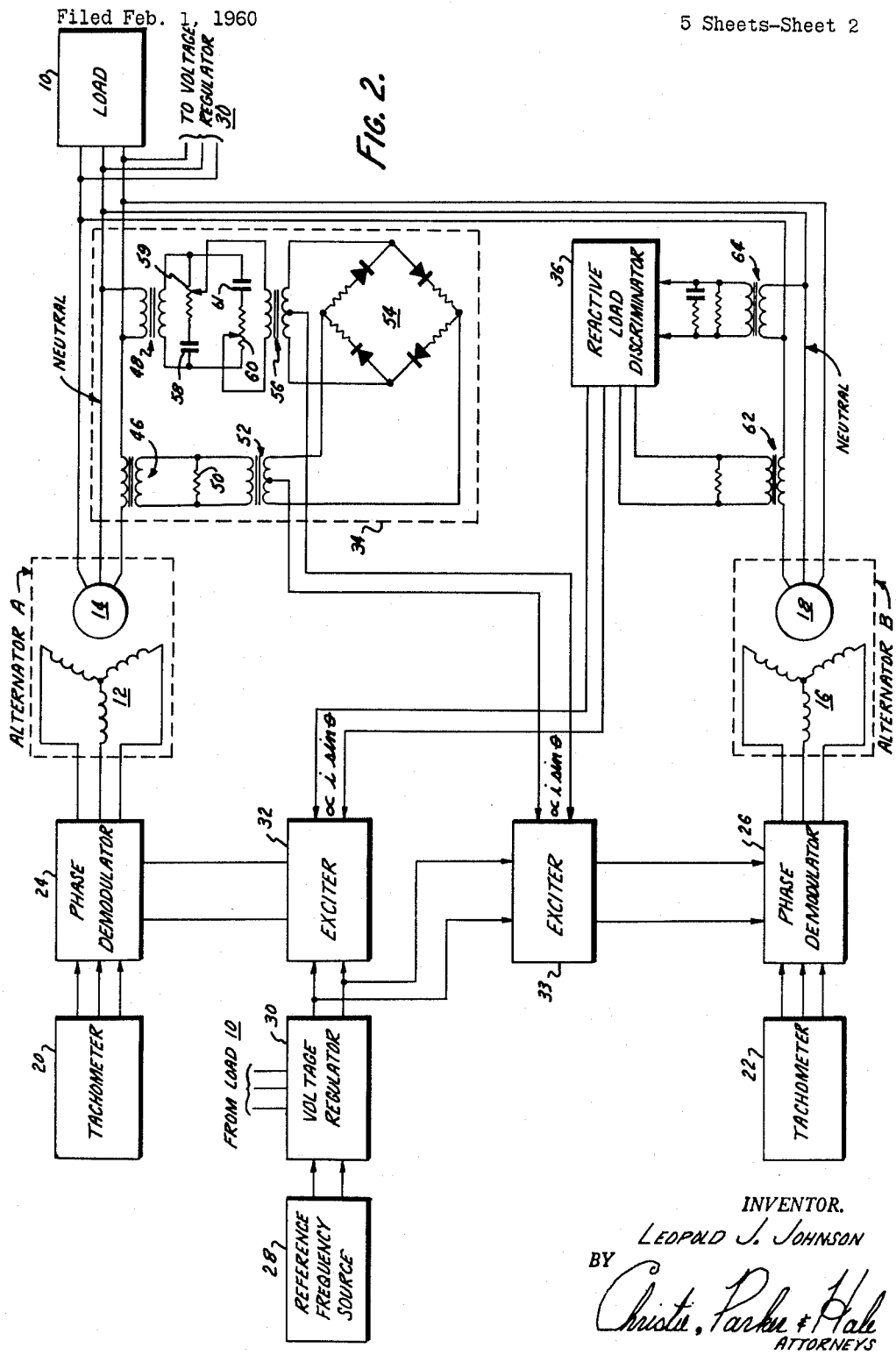
FIG. 2 is a block-circuit diagram of a reactive load control arrangement of the type shown in FIG. 1.

Now referring to FIG. 2, the circuit arrangement for controlling the balance of the reactive components of the load 10 will be examined in more detail. The circuit arrangement shown in FIG. 2 is the same as the block diagram of FIG. 1, except that the circuit details of the reactive load discriminator 34 are shown in detail. The reactive load discriminator 36 is shown in block form, and it will be understood that the circuit details thereof are similar to the details to be described for the discriminator 34. To sense the reactive load supplied by alternators A and B requires an indication of the current and voltage and the relative phase angle supplied by each alternator. The current indication is provided by the provision of a conventional current transformer 46, while the voltage indication is provided by the voltage transformer 48 connected across a pair of phases of the output lines supplied by the rotor 14 to give a single phase indication of the voltage. The current transformer 46 is shown provided with a parallel resistor 50 connected across its secondary winding and which resistor provides a voltage proportional to the current in the line delivered by alternator A. This voltage is coupled to the associated voltage transformer 52 having its secondary connected to a conventional phase demodulator, the bridge arrangement 54. The transformer 52 has its output terminals connected across a pair of diagonally disposed output terminals of the bridge network 54, shown as the top and bottom terminals. The bridge network 54 is connected to the voltage signal derived from transformer 48 across the remaining pair of terminals and which terminals are connected to the secondary winding of an input transformer 56. The primary of the input transformer 56 is coupled by means of a phase shifting arrangement to be described immediately hereinafter and in series circuit relationship with the secondary winding of the voltage transformer 48.

The phase shifting arrangement comprises a pair of parallel circuits, each including a capacitor and a variable resistor. A capacitor 58 is shown connected to one terminal of the secondary winding of voltage transformer 48 with the opposite terminal connected to a resistor 59, arranged in series circuit relationship with the capacitor 58. The movable arm for varying the resistance value of the resistor 59 is connected to a terminal of the primary winding of transformer 56. The opposite terminal for this primary winding is connected to the variable arm for a resistor 60 connected to the transformer 48 in common with the capacitor 58. A capacitor 61 is connected in series with resistor 60 and the transformer 48. The phase of the voltage applied to the transformer 56 is controlled by varying the position of the arms for resistors 59 and 60.

It will be appreciated that this phase shifting arrangement can be adjusted to provide a 90° phase shift between the voltage signal delivered to the primary of transformer 48 and that derived from the secondary of transformer 56. Therefore, the voltage derived from the secondary of transformer 56 is proportional to the voltage provided by alternator A having a phase angle $\theta + 90°$. The construction and operation of the bridge discriminator 54 is conventional and the signals derived therefrom are obtained from the center tapped connection for the secondary winding of each of the transformers 52 and 56. The signal derived from the center tapped lines are proportional to the reactive load supplied by alternator A or proportional to $i \sin \theta$, as mentioned hereinabove. The characteristic of the signal derived from the bridge arrangement 54 is a complex wave having an essentially direct current component with an alternating current component of a frequency twice the frequency of the output frequency of alternator A. This output indication is then applied to the exciter 33 for controlling the phase demodulator 26 which in turn controls the signals delivered to the field winding 16 of alternator B. The application of the control signal from the demodulator 34 to the exciter 33 is effective to change the gain of the exciter and thereby the amplitude of the output signal therefrom. The output amplitude of the control signals derived from the demodulator 24 will then be proportioned in accordance with the amplitude of the signals derived from the exciter 33.

In the same fashion, the reactive load component of the load 10 supplied by alternator B is sensed and an output indication thereof is provided by the reactive load discriminator 36. The input indications of the current voltage provided by alternator B are coupled to the discriminator 36 by the same means as provided for the discriminator 34. The current signal is provided by a current transformer 62 connected in series with the line from alternator B, while the voltage transformer 64 is connected across a pair of phases from alternator B with the secondary winding thereof. Assuming that the reactive load components supplied by alternators A and B are out of balance, the output indication of this unbalance derived from the discriminator 36 for alternator B will be of opposite polarity of the output indicator from discriminator 34 so as to control the exciter 32 in a direction opposite from the direction the exciter 33 is being controlled. In this fashion, the transfer of the reactive load between alternators A and B is accomplished to cause the alternators to share this load equally.

It should be noted that although this reactive control arrangement has been described in conjunction with only a pair of alternators, more than two alternators may be controlled by the control arrangement of this invention and which alternators would be arranged in a closed loop or ring circuit arrangement. The reactive load output indications would then be coupled back to the next succeeding alternator to control the field magnitude of that alternator, while the last alternator of the group would control the field magnitude of the first alternator.

Figure 3:
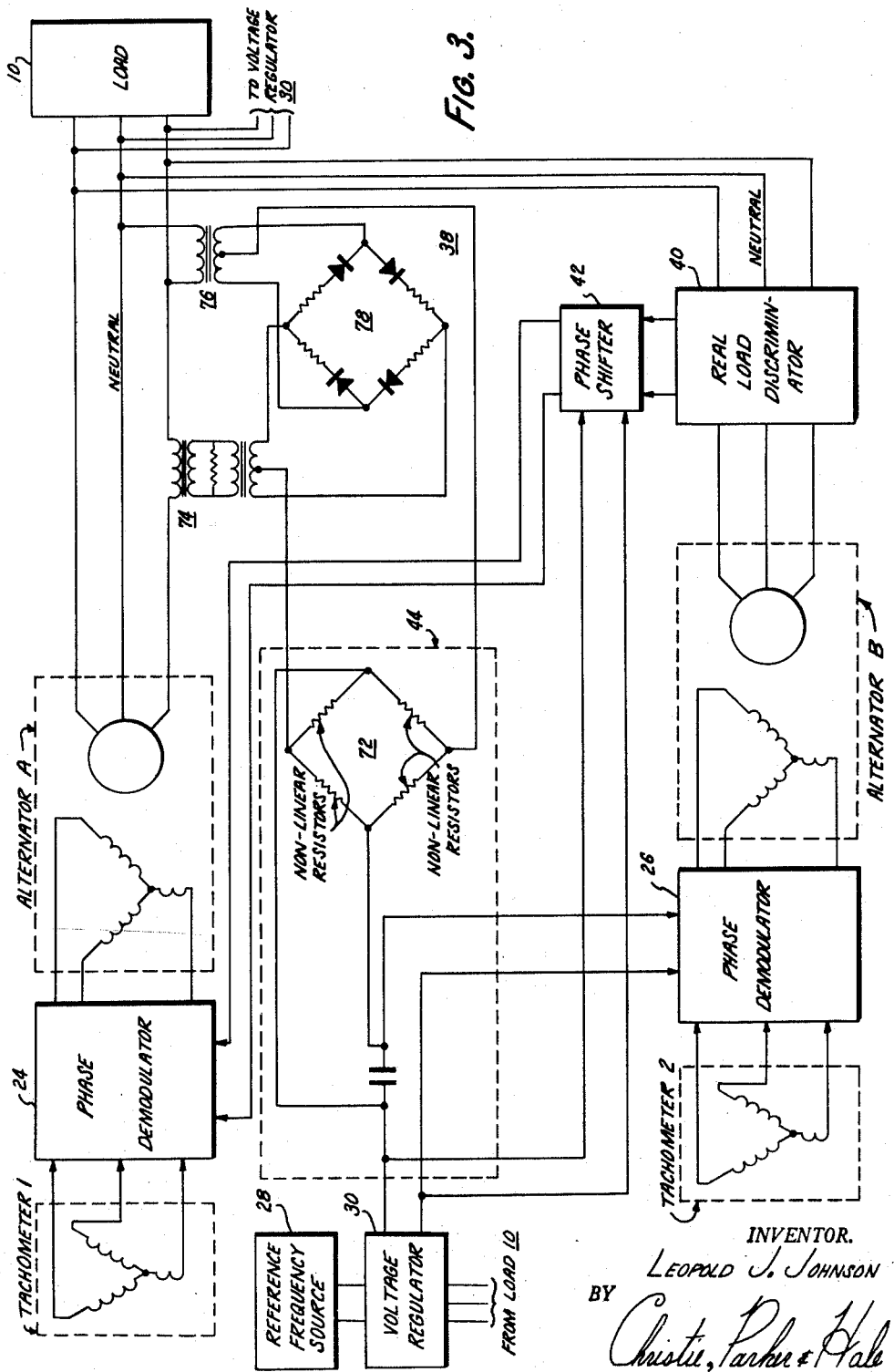
FIG. 3 is a block-circuit diagram of a real load control arrangement of the type shown in FIG. 1.
Figure 4:
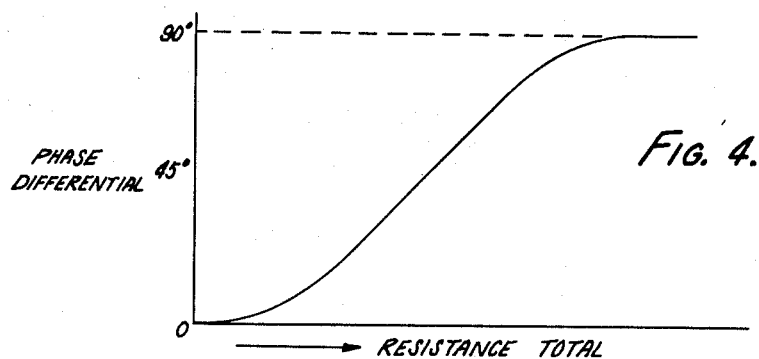
FIG. 4 is a graphical illustration of a typical overall resistance characteristic for the phase shifting bridge arrangement shown in FIG. 3.
Figure 5:
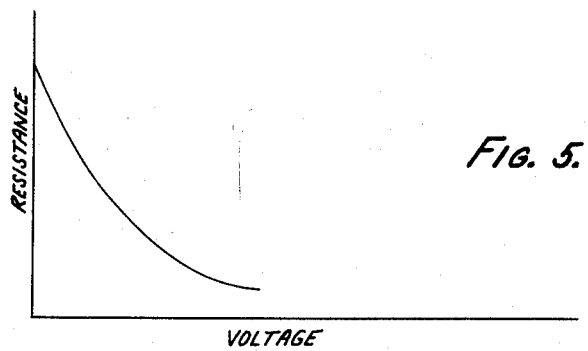
FIG. 5 is a graphical illustration of a typical characteristic of a non-linear resistance element employed in the bridge arrangement of FIG. 3.

Now referring to FIG. 3, the phase shifting circuit 44 shown in detail therein will be examined before discussing the control arrangement for balancing the real loads. The phase shifting arrangement 44 essentially comprises a parallel circuit of a fixed capacitor 70 and a bridge network 72 functioning as a variable resistance. It will be appreciated by those skilled in the art that the phase of a parallel resistance-capacitance circuit may be shifted by varying the resistance value of the resistive element therein. The bridge network 72 is constructed in the usual fashion having four arms, and in this instance each arm includes a non-linear resistor therein. The non-linear resistors are commercially available and may comprise thyrite resistors or selenium carbide resistors having a non-linear resistance characteristic of the type shown in FIG. 5. Assuming for the present, that the signal derived from the real load discriminator 38 provides the correct output indication of the real load supplied by alternator A and which output indication is applied across the top and bottom terminals of the bridge arrangement 72. The remaining terminals of the bridge arrangement 72 are connected across the capacitor 70 to complete the parallel circuit arrangement. The bridge arrangement 72 will be responsive to the load indication in a manner to provide an overall resistance characteristic of the type shown in FIG. 4. An examination of the resistance characteristic of FIG. 4 indicates the changes in resistance for the network 72 relative to the phase differential of the voltage and current supplied by the alternator. The operating region on the resistance curve of FIG. 4 over which the bridge arrangement 72 generally functions is over the essentially linear portion of the resistance characteristic. It will now be appreciated that with the application of the real load output indication to the bridge arrangement 72 the resistance of the bridge will vary and thereby the phase of the signal provided by the reference frequency source 28 will be shifted prior to application to the phase demodulator 26.

Now referring to FIG. 3 proper, the system illustrated for balancing the real load on a pair of alternators is based on FIG. 1 and utilizes the phase shifting circuits 42 and 44 described hereinabove. The real load discriminators 38 and 40 are each essentially the same type of discriminator arrangements as provided for the reactive load controls described in conjunction with FIG. 2. In each instance, the voltage and current supplied by each alternator to the load 10 is sensed and demodulated in the circuits 38 and 40. The current is sensed in this particular arrangement by means of a current transformer 74, and the single phase voltage is provided by the voltage transformer 76. In this instance, the voltage output from the transformer 76 is not phase shifted but applied directly to the diode bridge arrangement 78, similar to the bridge network 54. As in the previous instance, it will now be seen that the output indication derived from the bridge arrangement 78 and applied to the phase shifting bridge 72 is an indication of the real power or watts delivered by each of the alternators. It may be convenient to filter the harmonic output derived from the bridge arrangement 78 by means of a low pass filter. This output indication is proportional to $i \cos \theta$. As in the reactive load control system, the real load indications are applied to the phase demodulator for the opposite alternator, whereby the alternators are corrected in different directions to bring them into balance.

It should be note at this point that the action of the voltage regulator 30 overrides the correction provided by the phase shifters 42 and 44 and exciters 32 and 33, the latter mentioned elements only alter the control signals to the field windings to provide the balancing of the loads.

Although it was convenient to describe the invention in terms of frequency controlled alternators of the type of my Patent 2,854,617, the invention may be readily practised in combination with single phase alternators. An example of a single phase alternator that this invention is applicable to is disclosed in my copending application entitled "Apparatus for Producing Alternating Current," Serial No. 785,041, filed on January 5, 1959, and assigned to the same assignee as this application. The concept of this latter mentioned application resides in controlling the output frequency of a single phase alternator by applying an alternating current to the field winding to generate output currents having components proportional to the rotor speed which are modulated by the alternating current applied to the field winding. This output current is then demodulated to retrieve an alternating current having a frequency equal to the frequency of the alternating current applied to the field winding. A more comprehensive discussion of this type of alternator is disclosed in the above-identified copending application and which application is incorporated herein by reference.

When two or more alternators of this type are employed in parallel to supply a load, the balancing of the load may also be accomplished by the means disclosed hereinabove. The reactive load is still controlled by controlling the amplitude of the signals applied to the field winding for each alternator while the real load is balanced by shifting the relative phases of the signals applied to the field winding for each alternator. The voltage regulator 30 is coupled to the reference frequency source 80 and to sense the terminal voltage delivered to the load 10 by the single phase alternators A and B to maintain the terminal voltages of the alternators the same. As in the previous embodiment, the voltage regulator 30 overrides the control afforded by the phase shifters and the exciters whereby the latter elements effect only the load balance and not the terminal voltage of the alternators.

Now referring to FIG. 6, it will be seen that the single phase alternators A and B are each arranged with a field, an armature, and a demodulator, the output of the latter supplying the load 10 at a constant or controlled frequency. Intermediate the load 10 and the alternators A and B are provided the real and reactive load discriminators 34 and 38 for alternator A and the real and reactive load discriminators 36 and 40 for alternator B. The field excitation for each of the alternators A and B is provided by the reference frequency source 80. The currents provided by the source 80 are corrected in accordance with the load output indications provided by the discriminators. Accordingly, the phase and magnitude of the field excitation for alternator A is respectively controlled by the phase shifter 82 and exciter 84 in response to the signals from the discriminators 40 and 36 respectively. In the same fashion, phase shifter 86 and exciter 88 respond to discriminators 38 and 34 to control the field excitation for alternator B. This control will then automatically balance the real and reactive components of load 10 supplied by alternators A and B.

Although the above control arrangements have been described in conjunction with discriminators and phase demodulators of the bridge rectifier type, it will be appreciated that any other well known type of arrangement may be utilized in this invention. Demodulators using high vacuum tubes, magnetic amplifiers, or transistor circuit arrangements may be substituted for the phase demodulators or real and reactive load discriminators. It will also be noted that in the applications where only two alternators are operating in parallel to supply a given load, the control arrangements may be modified and simplified by operating on the field of only one alternator so as to correct it in the right direction towards balance, while the uncontrolled alternator will be forced to take on or give up load in response to this control. Also, since alternators operating in parallel necessarily require terminal voltages which are the same, the voltage of the alternators may be regulated for this purpose by operating on the alternator fields. This voltage regulation would be accomplished by a feedback network which is responsive to the output voltages of the alternators and which output voltage is fed back 180° out of phase with the desired voltage output to give an error signal and which error signal is utilized once again to control the amplitude of the energization of the polyphase field windings for the alternators.

What is claimed is:

1. Apparatus for automatically maintaining the load on alternators in balance including at least a pair of non-salient pole alternators each having a field winding, the output circuits of the alternators being connected in parallel circuit relationship, means connected to the field winding of each of the alternators for exciting same, means connected to the output circuits of said alternators for sensing the real and reactive loads supplied by each alternator and providing output indications thereof, and means responsive to the load output indications of one of said alternators for changing the amplitude and phase of the field excitation of another one of said alternators to bring the real and reactive components of the load on each alternator in balance.

2. Apparatus for automatically maintaining the load on alternators in balance including at least a pair of alternators having polyphase field windings and an armature, the alternators having their output circuits connected in parallel circuit relationship, means connected to the polyphase field windings of each of the alternators for energizing same with alternating current signals for producing a rotatable magnetic field for said armature, means connected to the field windings for controlling the phase relationship and frequency of the alternating currents which are applied to the field windings so as to control the direction and speed of rotation of the magnetic field which is produced by the field windings, means connected to the output circuits of said alternators for sensing the load supplied by each alternator and providing an output indication thereof, and correction means for each of said alternators responsive to the load output indication provided by said sensing means and coupled to said control means for another alternator for changing the field excitation thereof in a direction to bring each of said alternators in balance.

3. Apparatus for controlling the load on alternators operating in parallel including at least a pair of non-salient pole alternators having polyphase field windings, the alternators having their output circuits connected in parallel circuit relationship, means connected to the polyphase field windings of each of the alternators for energizing same to provide a rotatable field, means for providing a reference signal of preselected frequency, means coupled to the alternators for providing a signal proportional to the speed of rotation of each of the alternators, demodulating means coupled between the means for producing the reference signal and the speed signal and the field energizing means for each of the alternators for providing control signals to the fields thereof to control the direction and the speed of rotation of the magnetic field, means connected to the output circuits of said alternators for sensing a load supplied by each alternator and providing an output signal representative thereof, and correction means connected to be responsive to a load output signal for one alternator and coupled to the demodulating means for controlling the demodulated output signals in accordance with the sensed load on each alternator to bring the load on each alternator in balance.

4. Apparatus for automatically maintaining the load on alternators in balance including at least a pair of non-salient pole alternators each having a field winding, the alternators having their output circuits connected in parallel to supply a load having real and reactive components, means connected to the field winding of each of the alternators for energizing same, means connected to the output circuits of said alternators for sensing the real load supplied by each alternator and providing an output indication thereof, and means connected to the output circuits of said alternators for sensing the reactive load supplied by each alternator and providing an output indication thereof, and correction means for each of said alternators connected to said sensing means to be responsive to the real and reactive load output indications to change the phase and amplitude of the signals supplied to the field winding of another alternator to bring the load components of each alternator in balance.

5. Apparatus for automatically maintaining the load on alternators in balance as defined in claim 4 including means connected to the field windings for controlling the phase relationship and frequency of the alternating currents which are applied to the field winding of each alternator and connected to be responsive to said correction means.

6. Apparatus for automatically maintaining the load on alternators in balance including at least a pair of non-salient pole alternators each having a field winding, the output circuits of the alternators being connected in parallel circuit relationship for supplying a real load, means connected to the field windings of each of the alternators for energizing same, means connected in the output circuits of said alternators for sensing the real load supplied by each alternator and providing an output indication thereof, and correction means for each of said alternators connected to said sensing means to be responsive to the real load output indication to change the phase of the signals supplied to the field winding of another alternator to bring the real load on each alternator in balance.

7. Apparatus for automatically maintaining the load on alternators in balance including at least a pair of non-salient pole alternators each having a field winding, the output circuits of the alternators being connected in parallel circuit relationship for supplying a real load, means reactive component, means connected to the field winding of each of the alternators for energizing same, means connected to the output circuits of said alternators for sensing the reactive load supplied by each alternator and providing an output indication thereof, and correction means for each of said alternators connected to said sensing means to be responsive to the reactive load output indication to change the amplitude of the signals supplied to the field winding of another alternator to bring the reactive load on each alternator in balance.

8. Apparatus for controlling the load on alternators operating in parallel including at least a pair of non-salient pole alternators having their output circuits connected in parallel circuit relationship and each having polyphase field windings, means connected to the polyphase field windings of each of the alternators for energizing same to provide a rotatable field, means for providing a reference signal of preselected frequency, means coupled to the alternators for providing a signal proportional to the speed of rotation of each of the alternators, demodulating means coupled between the means for producing the reference signal and the speed signal and the field energizing means for each of the alternators for providing control signals to the fields thereof to control the direction and the speed of rotation of the magnetic field, means connected to the output circuits of said alternators for sensing the reactive load supplied by each alternator and providing an output signal representative thereof, and correction means including amplitude control means connected to said sensing means to be responsive to the reactive load output signal for one alternator and coupled to the demodulating means for controlling the amplitude of the control signals in accordance with the reactive load sensed on each alternator to transfer the reactive load on each alternator to bring the loads in balance.

9. Apparatus for controlling the load on alternators operating in parallel including at least a pair of non-salient pole alternators having their output circuits connected in parallel circuit relationship and each having polyphase field windings, means connected to the polyphase field windings of each of the alternators for energizing same to provide a rotatable field, means for providing a reference signal of preselected frequency, means coupled to said alternators for providing a signal proportional to the speed of rotation of each of the alternators, demodulating coupled between the means for producing the reference signal and the speed signal and the field energizing means for each of the alternators for providing control signals to the fields thereof to control the direction and the speed of rotation of the magnetic field, means connected to the output circuits of said alternators for sensing the real load supplied by each alternator and providing an output signal representative thereof, and correction means including phase shifting means connected to be responsive to the real load output signal for one alternator and coupled to the demodulating means for controlling the phase of the control signals in accordance with the real load of each alternator to bring the real load on each alternator in balance.

10. Apparatus for controlling the load on alternators operating in parallel as defined in claim 9 wherein said phase shifting means comprises a bridge arrangement of non-linear resistors arranged in parallel circuit relationship with a capacitor.

11. Apparatus for controlling the load on alternators operating in parallel including at least a pair of non-salient pole alternators having their output circuits connected in parallel circuit relationship and each having polyphase field windings, means connected to the polyphase field windings of each of the alternators for energizing to provide a rotatable field, means connected to the output circuits of said alternators for maintaining the terminal voltages of each alternator substantially the same, means for providing a reference signal of preselected frequency, means coupled to the alternators for providing a signal proportional to the speed of rotation of each of the alternators, demodulating means coupled between the means for producing the reference signal and the speed signal and the field energizing means for each of the alternators for providing control signals to the fields thereof to control the direction and the speed of rotation of the magnetic field, means connected to the output circuits of said alternators for sensing the real and reactive load supplied by each alternator and providing output signals representative thereof, and correction means connected to be responsive to the load output signals for one alternator and coupled to the demodulating means for controlling the amplitude and phase of the aforementioned control signals in accordance with the load sensed on each alternator to bring the real and reactive loads on each alternator in balance as well as to operate each alternator at a controlled output frequency related to said preselected reference frequency.

12. Apparatus for controlling the load on alternators operating in parallel including at least a pair of non-salient pole alternators connected in parallel, each of said alternators including a field winding and an armature, means connected to energize the field winding for each alternator with an alternating current reference signal, means for producing relative motion between said field winding and said armature whereby currents generated in the armature comprise a component having the frequency of the reference signal and one having a frequency proportional to the relative speed of the armature and field, demodulating means for each of said alternators connected to be responsive to the armature currents and providing currents for the load having the frequency of the reference signal, means for sensing the load supplied by each alternator and providing an output indication thereof, and correction means for each of said alternators connected to be responsive to a load output indication provided by said sensing means of another alternator for changing the field excitation thereof in a direction to bring the load on each of said alternators in balance.

13. Apparatus for controlling the load on alternators operating in parallel as defined in claim 12 wherein said means for sensing the load supplied by each alternator includes means for sensing the real and reactive components of the load and providing output indications thereof, and means responsive to the load output indications of one of said alernators for changing the amplitude and phase of said reference signal to bring the real and reactive components of the load on each alternator in balance.

14. Apparatus for controlling the load on alternators operating in parallel including at least a pair of non-salient pole alternators having their output circuits connected in parallel to supply a load, each of said alternators including a single phase field winding and an armature, means connected to the output circuits of said alternators for maintaining the terminal voltages of each of said alternators substantially the same, means connected to the field winding for each alternator for energizing same with an alternating current reference signal of predetermined reference signal, means for producing relative motion between said field winding and said armature whereby currents generated in the armature comprise a component having the frequency of the reference signal and one having a frequency proportional to the relative speed of the armature and the field, demodulating means for each of said alternators connected to be responsive to the armature currents and provide output currents for a load only having the frequency of the predetermined reference signal, means connected to the output circuits of said alternators for sensing the real component of the load supplied by each alternator and providing an output indication thereof, means connected to the output circuits of said alternators for sensing the reactive component of the load and providing an output indication thereof, and means responsive to the real and reactive load output indications of one of said alternators for changing the amplitude and phase of said reference signal of the other alternator to bring the real and reactive components of the load supplied by each alternator in balance.

References Cited by the Examiner

UNITED STATES PATENTS

| | | | |
|---|---|---|---|
| 2,524,761 | 10/50 | Brown | 323—123 |
| 2,750,556 | 6/56 | La Hue | 323—123 |
| 2,933,615 | 4/60 | Brown | 307—57 |
| 2,964,467 | 1/61 | Hysler | 307—57 |
| 2,972,058 | 2/61 | Kahle | 307—57 |
| 2,986,647 | 3/61 | Britten | 307—57 |

RALPH D. BLAKESLEE, *Acting Primary Examiner.*

MILTON O. HIRSHFIELD, LLOYD McCOLLUM,
*Examiners.*

UNITED STATES PATENT OFFICE
CERTIFICATE OF CORRECTION

Patent No. 3,185,857                                        May 25, 1965

Leopold J. Johnson

It is hereby certified that error appears in the above numbered patent requiring correction and that the said Letters Patent should read as corrected below.

Column 6, lines 62 and 63, for "indicator" read -- indication --; column 10, lines 35 and 36, for "supplying a real load, means reactive component," read -- supplying a load including a reactive component, --; column 11, line 6, before "coupled" insert -- means --; column 12, line 2, for "providing" read -- provide --.

Signed and sealed this 30th day of November 1965.

(SEAL)
Attest:

ERNEST W. SWIDER
Attesting Officer

EDWARD J. BRENNER
Commissioner of Patents